F. B. GIRVIN & C. P. BRADY.
FLY CATCHER.
APPLICATION FILED JAN. 5, 1917.

1,258,763.

Patented Mar. 12, 1918.
3 SHEETS—SHEET 1.

Witnesses

Inventors
F. B. Girvin
C. P. Brady,
By Victor J. Evans
Attorney

F. B. GIRVIN & C. P. BRADY.
FLY CATCHER.
APPLICATION FILED JAN. 5, 1917.
1,258,763.
Patented Mar. 12, 1918.
3 SHEETS—SHEET 2.
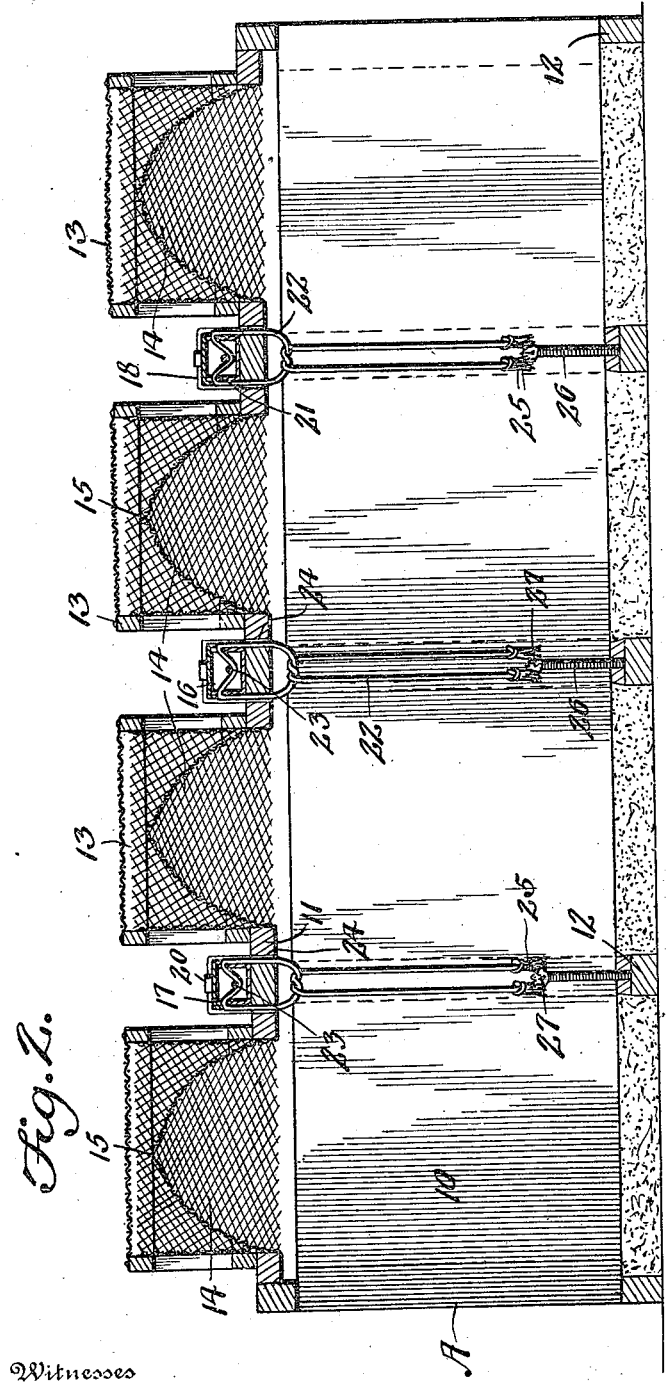
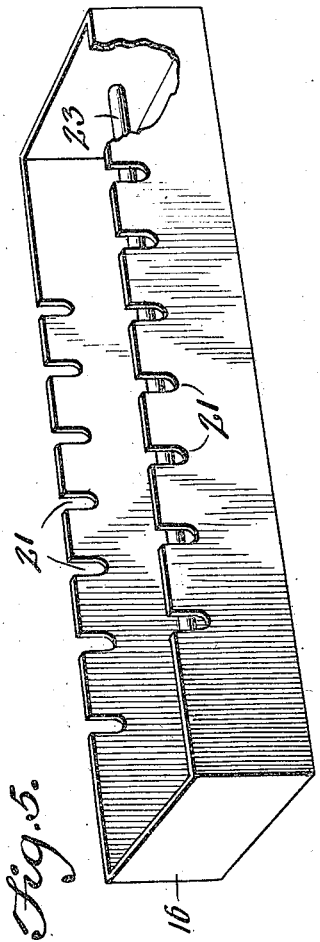
Inventors
F. B. Girvin
C. P. Brady,
By Victor J. Evans
Attorney

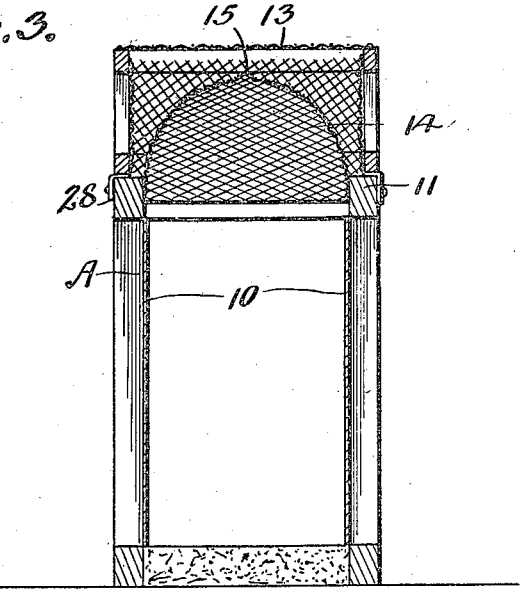
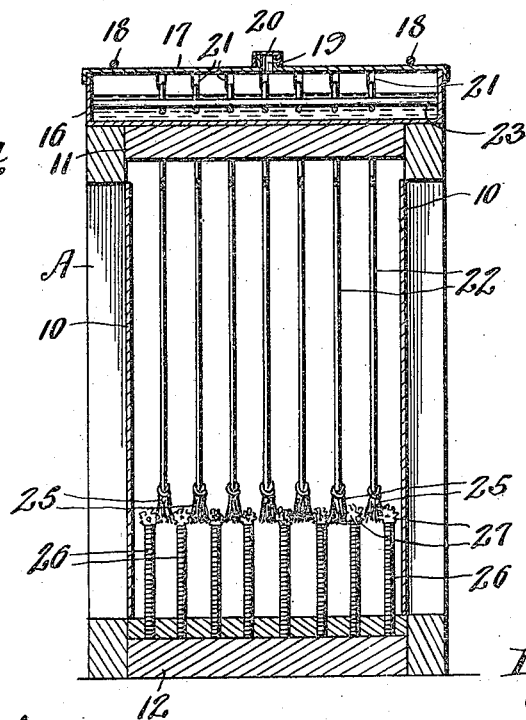

UNITED STATES PATENT OFFICE.

FITZHUGH B. GIRVIN AND CHARLES P. BRADY, OF GEORGETOWN, TEXAS.

FLY-CATCHER.

1,258,763.

Specification of Letters Patent.　Patented Mar. 12, 1918.

Application filed January 5, 1917.　Serial No. 140,815.

*To all whom it may concern:*

Be it known that we, FITZHUGH B. GIRVIN and CHARLES P. BRADY, citizens of the United States, residing at Georgetown, in the county of Williamson and State of Texas, have invented new and useful Improvements in Fly-Catchers, of which the following is a specification.

This invention comprehends the provision of a fly trap embodying among other features a chute through which the horses, cows and other animals may pass, means being arranged within the chute for scaring and brushing off flies from the animals, and causing the same to enter a trap in an effort to escape from the chute.

One of the chief characteristics of the invention resides in the provision of means which in addition to brushing flies from the animal, will convey to the body of the latter an insecticide or disinfectant fluid with a view of destroying vermin of the character that prove annoying to animals.

The invention embodies the desired features of simplicity in construction, and durability, the trapping compartments being associated with the chute to permit the same to be removed when desired, to dispose of the flies trapped therein.

The nature and advantages of the invention will be better understood from the following description when read in connection with the accompanying drawings, the invention residing in the construction, combination and arrangement of parts as claimed.

In the drawings forming part of this specification like numerals of reference indicate similar parts in the several views and wherein:—

Fig. 2 is a vertical longitudinal sectional view taken on line 2—2 of Fig. 1.

Fig. 3 is a vertical transverse sectional view taken on line 3—3 of Fig. 1.

Fig. 4 is a similar view taken on line 4—4 of Fig. 1.

Fig. 5 is an enlarged detail view of one of the fluid containing tanks with the cover removed.

Figure 1:
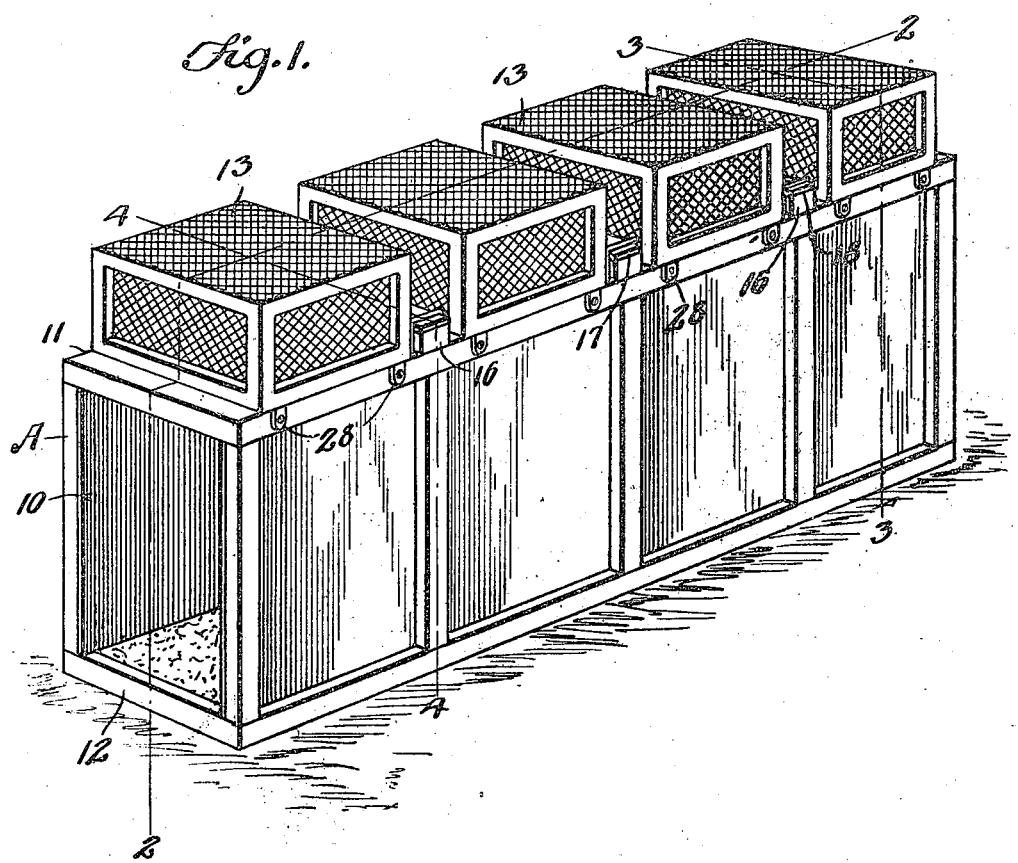
Figure 1 is a perspective view of the device constructed in accordance with my invention.

Referring more particularly to the drawings A indicates generally a chute adapted to be secured to the ground or surface in any suitable manner, and embodying spaced parallel side walls 10 and a top 11, the side walls being connected adjacent their lower edges by means of a plurality of transverse strips 12. The chute as a whole may be constructed from any suitable material, and of any desired dimensions, it being understood that the chute is of a sufficient size to permit cows, horses and other animals to pass therethrough from end to end.

Mounted upon the top wall 11 of the chute is a plurality of spaced inverted receptacles 13 defining trapping compartments, and within each receptacle projects a member 14 which may be of any suitable construction, having a restricted central opening 15 establishing communication between the receptacle 13 and the chute A, the members 14 opening into the chute through an enlarged opening in the top 11 thereof. As the animals pass singly through the chute, the flies are scared and brushed off the animals by means arranged within the chute to be hereinafter described, and in an attempt to escape from the chute the flies enter the member 14 and pass therefrom through a restricted opening 15 into one or the other of the receptacles 13 in which they are trapped. It might here be stated that the receptacles 13 may be constructed from any suitable material, and any number employed consistent with the size of the chute A.

Positioned between the receptacles 13 and secured to the top 11 of the chute in any suitable manner are tanks 16 which extend across the entire width of the top 11 and adapted to contain an insecticide or disinfectant fluid, each tank being provided with a cover 17 which is preferably held associated with the tank by means of the U-shaped clamps 18, which as shown in this particular instance are employed for holding the tanks immovably positioned upon the top 11 of the chute. The covers 17 are each provided with an opening 19 through which the tanks can be filled with the fluid from time to time, the openings being closed by means of caps 20. The opposite walls of the tank are provided with alined notches 21, each pair of notches receiving a flexible textile element 22 having its intermediate portion threaded beneath a rod 23 extending longitudinally of each tank 16 and secured to the end walls thereof, the rods 23 serving to hold the intermediate portions of the flexible elements positioned within the tank so as to be properly saturated with the fluid contained therein. The parallel strands of each element projecting from the opposite sides of the tank are passed through suitable openings 24 in the top 11 and depend within the chute A. It is of course obvious that any number of flexible elements may be used in connection with each tank, and are provided with tassel-like ends 25. The strands of each of the flexible elements are tied immediately beneath the top 11 of the chute so that these strands will normally lie in planes at opposite sides of the resilient elements 26 rising from the transverse strips 12. The resilient elements are preferably in the nature of coil springs which are secured to the strips 12 in longitudinal series, the upper end of each spring supporting a mop head 27 adapted to be saturated with the disinfectant fluid contained in the tanks 16, it being understood that the fluid is conveyed to the mop heads by means of the strands of the flexible elements 23, which latter are also kept saturated with the fluid so that as the animal passes through the chute, the strands of the elements 22, and the springs 26 will be agitated, thereby scaring the flies, and brushing the same from the animal by coming in contact with the body. By reason of the specific disposition of the elements 22 and the springs 26, flies are not only brushed off the animal, but all parts of the animal's body are simultaneously saturated with the insecticide or disinfectant fluid with a view of maintaining the animal's body free from vermin of the character which proves very annoying to animals.

The receptacles 13 are secured upon the top 11 of the chute by means of the fastening elements 28, which latter may be of any suitable construction, and capable of being released to permit the receptacles to be removed from the chute when it is desired to dispose of the insects trapped therein.

While it is believed that from the foregoing description the nature and advantages of the invention will be readily apparent, we desire to have it understood that we do not limit ourselves to the precise construction herein illustrated and described, and that various changes may be made when desired as fall within the scope of what is claimed.

What is claimed is:—

1. A device of the class described comprising a chute through which an animal may pass, a plurality of resilient elements disposed within the chute to be agitated by the animal, and a mop head carried by the free extremity of each of said elements.

2. A device of the class described comprising a chute through which an animal may pass, a plurality of resilient elements disposed within the chute to be agitated by the animal, a mop head carried by the free extremity of each of said elements, and means for conveying an insecticide fluid to the mop head.

3. A device of the class described comprising a chute through which an animal may pass, a plurality of resilient elements disposed within said chute to be agitated by the animal, a mop head carried by the free extremity of each of said elements, and a trap supported upon the chute and communicating therewith.

4. A device of the class described comprising a chute through which an animal may pass, a plurality of flexible elements disposed within the chute to be agitated by the animal, means for saturating the elements with an insecticide fluid, a plurality of resilient elements disposed within the chute to be agitated by the animal, a mop head carried by each of said resilient elements and adapted to be saturated with the insecticide fluid from said flexible elements, and a trap supported on said chute and communicating therewith.

5. A device of the class described comprising a chute through which an animal may pass, an insecticide fluid containing tank associated with the chute, a plurality of flexible elements depending within the chute, and each having a portion held within the tank whereby said elements are saturated with said fluid, a plurality of resilient elements arranged within the chute, a mop head carried by each element and adapted to be saturated with the fluid in said elements, and a trap removably supported on the chute and communicating therewith.

In testimony whereof we affix our signatures.

FITZHUGH B. GIRVIN.
CHARLES P. BRADY.

Copies of this patent may be obtained for five cents each, by addressing the "Commissioner of Patents, Washington, D. C."